US012752767B2

(12) United States Patent
Ito

(10) Patent No.: US 12,752,767 B2
(45) Date of Patent: Oct. 6, 2026

(54) CONTROLLER, VEHICLE, AND CONTROL METHOD

(71) Applicant: ISUZU MOTORS LIMITED, Yokohama (JP)

(72) Inventor: Hikaru Ito, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 303 days.

(21) Appl. No.: 18/442,145

(22) Filed: Feb. 15, 2024

(65) Prior Publication Data

US 2024/0286600 A1 Aug. 29, 2024

(30) Foreign Application Priority Data

Feb. 24, 2023 (JP) ................................ 2023-027392

(51) Int. Cl.

| | |
|---|---|
| ***B60W 20/10*** | (2016.01) |
| ***B60W 20/11*** | (2016.01) |
| ***B60W 20/14*** | (2016.01) |
| ***B60W 20/15*** | (2016.01) |
| *F02D 43/04* | (2006.01) |

(52) U.S. Cl.

CPC ............ *B60W 20/11* (2016.01); *B60W 20/14* (2016.01); *B60W 20/15* (2016.01); *F02D 43/04* (2013.01)

(58) Field of Classification Search

CPC ...... B60W 20/15; B60W 10/06; B60W 10/08; F02D 2041/389

See application file for complete search history.

(56) References Cited

U.S. PATENT DOCUMENTS

| | | | | |
|---|---|---|---|---|
| 4,774,811 | A | 10/1988 | Kawamura | |
| 6,422,001 | B1 | 7/2002 | Sherman et al. | |
| 8,442,744 | B2 * | 5/2013 | Kurtz .................. | F02D 41/402 123/703 |
| 9,732,681 | B2 | 8/2017 | Haughton et al. | |
| 2001/0054416 | A1 | 12/2001 | Yoshizaki | |
| 2007/0023020 | A1 * | 2/2007 | Yoshidome ......... | F02D 41/1454 123/703 |
| 2009/0031724 | A1 | 2/2009 | Ruiz | |
| 2011/0018267 | A1 | 1/2011 | Oriet et al. | |
| 2012/0017585 | A1 | 1/2012 | Shimizu | |

(Continued)

FOREIGN PATENT DOCUMENTS

| | | | |
|---|---|---|---|
| CN | 102019847 | A | 4/2011 |
| DE | 102005018575 | A1 | 1/2006 |

(Continued)

*Primary Examiner* — Marc Q Jimenez
*Assistant Examiner* — James J Triggs
(74) *Attorney, Agent, or Firm* — Shih IP Law Group, PLLC

(57) ABSTRACT

A vehicle includes: an acquisition part that acquires the oxygen concentration of exhaust from an engine mounted on the vehicle that can travel on an electric driving force generated by an electric motor and an engine driving force generated by the engine; and a drive control part that reduces an injection amount of fuel injected into a cylinder of the engine and increases the electric driving force, from among the engine driving force and the electric driving force for propelling the vehicle, in the case where the oxygen concentration is lower than an oxygen threshold value in comparison to the case where the oxygen concentration is equal to or higher than the oxygen threshold value.

6 Claims, 7 Drawing Sheets

(56) References Cited

U.S. PATENT DOCUMENTS

| | | | |
|---|---|---|---|
| 2012/0273288 A1 | 11/2012 | Yamazaki | |
| 2012/0329603 A1 | 12/2012 | Yamazaki et al. | |
| 2014/0172207 A1 | 6/2014 | Akashi | |
| 2014/0180561 A1* | 6/2014 | Kurtz | F02D 19/081<br>701/109 |
| 2020/0158039 A1 | 5/2020 | Aoki et al. | |
| 2020/0398818 A1* | 12/2020 | Nagamine | F02D 41/1454 |
| 2020/0398819 A1 | 12/2020 | Higuchi | |

FOREIGN PATENT DOCUMENTS

| | | | |
|---|---|---|---|
| DE | 102005008156 A1 | | 9/2006 |
| DE | 60119469 T2 | | 11/2006 |
| DE | 602005000146 T2 | | 10/2007 |
| JP | 2000-045817 A | | 2/2000 |
| JP | 2001-329902 A | | 11/2001 |
| JP | 2002-038962 A | | 2/2002 |
| JP | 2009-126303 A | | 6/2009 |
| JP | 2010-180708 A | | 8/2010 |
| JP | 2013-181393 A | | 9/2013 |
| JP | 2014051199 A | * | 3/2014 |
| JP | 2014-117962 A | | 6/2014 |
| JP | 2015-229930 A | | 12/2015 |
| JP | 2016-175498 A | | 10/2016 |
| JP | 2017-105354 A | | 6/2017 |
| JP | 2017-145748 A | | 8/2017 |
| JP | 2017-178006 A | | 10/2017 |
| JP | 2017-214893 A | | 12/2017 |
| JP | 2020-128134 A | | 8/2020 |
| JP | 2022-164093 A | | 10/2022 |
| WO | 2010098360 A1 | | 9/2010 |
| WO | 2012081272 A1 | | 6/2012 |
| WO | 2019073561 A1 | | 4/2019 |
| WO | 2019116589 A1 | | 6/2019 |

* cited by examiner

CONTROLLER, VEHICLE, AND CONTROL METHOD

CROSS-REFERENCE TO RELATED APPLICATIONS

The present application claims priority to Japanese Patent Application number 2023-027392, filed on Feb. 24, 2023. The contents of this application are incorporated herein by reference in their entirety.

BACKGROUND OF THE INVENTION

Electronic control of fuel supply to an engine is widely practiced. For example, Japanese Unexamined Patent Application Publication No. 2015-229930 discloses that an injector's injection amount into an engine is controlled such that the air-fuel ratio of the engine is maintained near the theoretical air-fuel ratio.

BRIEF SUMMARY OF THE INVENTION

In the technology described in Japanese Unexamined Patent Application Publication No. 2015-229930, if the air-fuel ratio, which is the ratio of the mass of air to the mass of fuel in an air-fuel mixture drawn into the engine, is on the rich end with a low air-fuel ratio, the injection amount from the injector is reduced so as to bring the air-fuel ratio close to the stoichiometric air-fuel ratio. At this time, in the technology disclosed in Japanese Unexamined Patent Application Publication No. 2015-229930, there was a tendency for engine torque to be insufficient due to a decrease in the injection amount.

The present disclosure focuses on this point, and its object is to provide a controller, a vehicle, and a control method capable of preventing insufficient engine torque while preventing the air-fuel ratio from becoming excessively small.

A controller according to a first aspect of the present disclosure includes: an acquisition part that acquires an oxygen concentration of exhaust from an engine); and a drive control part that reduces an injection amount of fuel injected into a cylinder of the engine and increases an electric driving force generated by an electric motor, from among the electric driving force generated by the electric motor and an engine driving force generated by the engine for propelling the vehicle, in a case where the oxygen concentration is lower than an oxygen threshold value in comparison to a case where the oxygen concentration is equal to or higher than the oxygen threshold value.

A vehicle according to a second aspect of the present disclosure includes: an electric motor that generates an electric driving force for propelling the vehicle; an engine that generates an engine driving force for propelling the vehicle; an acquisition part that acquires an oxygen concentration of exhaust from the engine; and a drive control part that reduces an injection amount of fuel injected into a cylinder of the engine and increases an electric driving force, from among the engine driving force and the electric driving force for propelling the vehicle, in a case where the oxygen concentration is lower than an oxygen threshold value in comparison to a case where the oxygen concentration is equal to or higher than the oxygen threshold value.

A control method according to a third aspect of the present disclosure includes computer-implemented steps of: acquiring an oxygen concentration of exhaust from an engine; and reducing an injection amount of fuel injected into a cylinder of the engine and increasing an electric driving force generated by an electric motor, from among the electric driving force generated by the electric motor and an engine driving force generated by the engine for propelling the vehicle, in a case where the oxygen concentration is lower than an oxygen threshold value in comparison to a case where the oxygen concentration is equal to or higher than the oxygen threshold value.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of a Vehicle]

Figure 1:
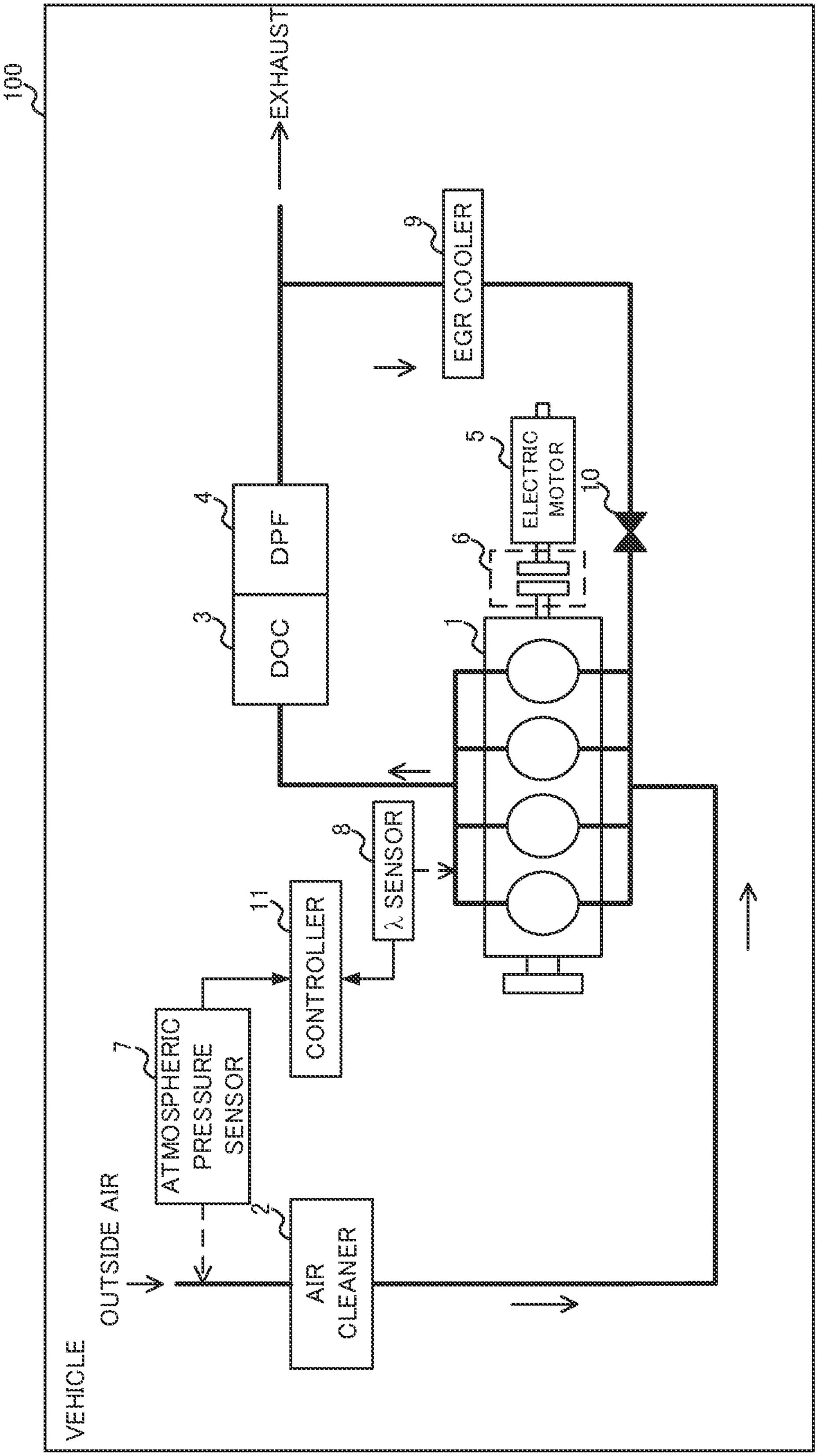
FIG. 1 shows a configuration of a vehicle according to an embodiment.

FIG. 1 shows a configuration of a vehicle 100 according to the present embodiment. The vehicle 100 is a commercial vehicle such as a truck, for example. The vehicle 100 includes an engine 1, an air cleaner 2, a DOC (Diesel Oxidation Catalyst) 3, a DPF (Diesel Particulate Filter) 4, an electric motor 5, a clutch 6, an atmospheric pressure sensor 7, a λ sensor 8, an EGR cooler 9, an EGR valve 10, and a controller 11. The vehicle 100 can travel on an electric driving force generated by the electric motor 5 and an engine driving force generated by the engine 1.

A thick line in FIG. 1 indicates a route of air in the vehicle 100. Arrows in FIG. 1 indicate a flow of air in the route of air. In the example of FIG. 1, outside air drawn in through the air cleaner 2 passes through the engine 1, the DOC 3, and the DPF 4 in this order, and is discharged to the outside. Part of the air discharged from the DPF 4 returns to the engine 1 through the EGR cooler 9 and the EGR valve 10.

The engine 1 is mounted on the vehicle 100. The engine 1 generates the engine driving force for propelling the vehicle 100. The engine 1 is a naturally aspirated engine, and may be a turbo engine, for example. The air cleaner 2 is a filter that removes dust from the air drawn from the outside of the vehicle 100.

The DOC 3 oxidizes hydrocarbon, carbon monoxide, nitrogen monoxide, or the like contained in exhaust of the engine 1. The DPF 4 is a filter that removes fine particles from the exhaust of the engine 1. The DPF 4 is provided at a stage following after the DOC 3.

The electric motor 5 is a motor that generates the electric driving force for propelling the vehicle 100. An output shaft of the electric motor 5 is connected to a drive shaft of the vehicle 100. Wheels are provided at both ends of the drive shaft. When the output shaft rotates, the wheels provided at both ends of the drive shaft rotate, and therefore the vehicle 100 travels. The electric motor 5 is a PM (Permanent Magnet) motor, for example. The electric motor 5 is provided between the engine 1 and a transmission (not shown). The electric motor 5 may be provided in or around a flywheel of the engine 1. The electric motor 5 also operates as a generator. For example, the electric motor 5 operates as a regenerative brake that generates electric power during braking, and generates a braking force (hereinafter also referred to as a regenerative braking force). The clutch 6 switches whether to transmit rotation of the engine 1 to the electric motor 5 or the like.

The atmospheric pressure sensor 7 measures atmospheric pressure of the air drawn into the engine 1. The atmospheric pressure sensor 7 measures the atmospheric pressure of the air before passing through the air cleaner 2. The atmospheric pressure sensor 7 inputs the measured atmospheric pressure to the controller 11.

The λ sensor 8 measures the oxygen concentration in the exhaust from the engine 1. In the example of FIG. 1, the λ sensor 8 measures the oxygen concentration in the exhaust passing through an exhaust manifold, for example. The λ sensor 8 inputs the measured oxygen concentration to the controller 11.

The EGR cooler 9 cools exhaust to be returned to the engine 1 in exhaust gas recirculation in which the exhaust from the engine 1 is returned to the engine 1. The EGR valve 10 adjusts an amount of the exhaust to be returned to the engine 1 in the exhaust gas recirculation.

The controller 11 is an ECU (Electronic Control Unit), for example. If the oxygen concentration measured by the λ sensor 8 is lower than an oxygen threshold value, the controller 11 determines that the air-fuel ratio, which is the ratio of the mass of air to the mass of fuel in an air-fuel mixture drawn into the engine, is excessively small. If the oxygen concentration measured by the λ sensor 8 is lower than the oxygen threshold value, the controller 11 reduces an injection amount of the fuel injected into a cylinder of the engine 1, in comparison to the case where the oxygen concentration is equal to or higher than the oxygen threshold value. The oxygen threshold value is the minimum value of the oxygen concentration required to prevent an air shortage in the engine 1, for example.

Due to the controller 11 reducing the injection amount of the fuel injected into the cylinder of the engine 1, an engine torque may be insufficient. The controller 11 controls the electric motor 5 so that the driving force generated by the electric motor 5 becomes larger than in the case where the injection amount of the fuel is not reduced, in order to compensate for the insufficient engine torque when the injection amount of the fuel is reduced.

In this way, the controller 11 can prevent insufficient engine torque while preventing the air-fuel ratio from becoming excessively small.

[Configuration of Main Parts of the Vehicle 100]

Figure 2:
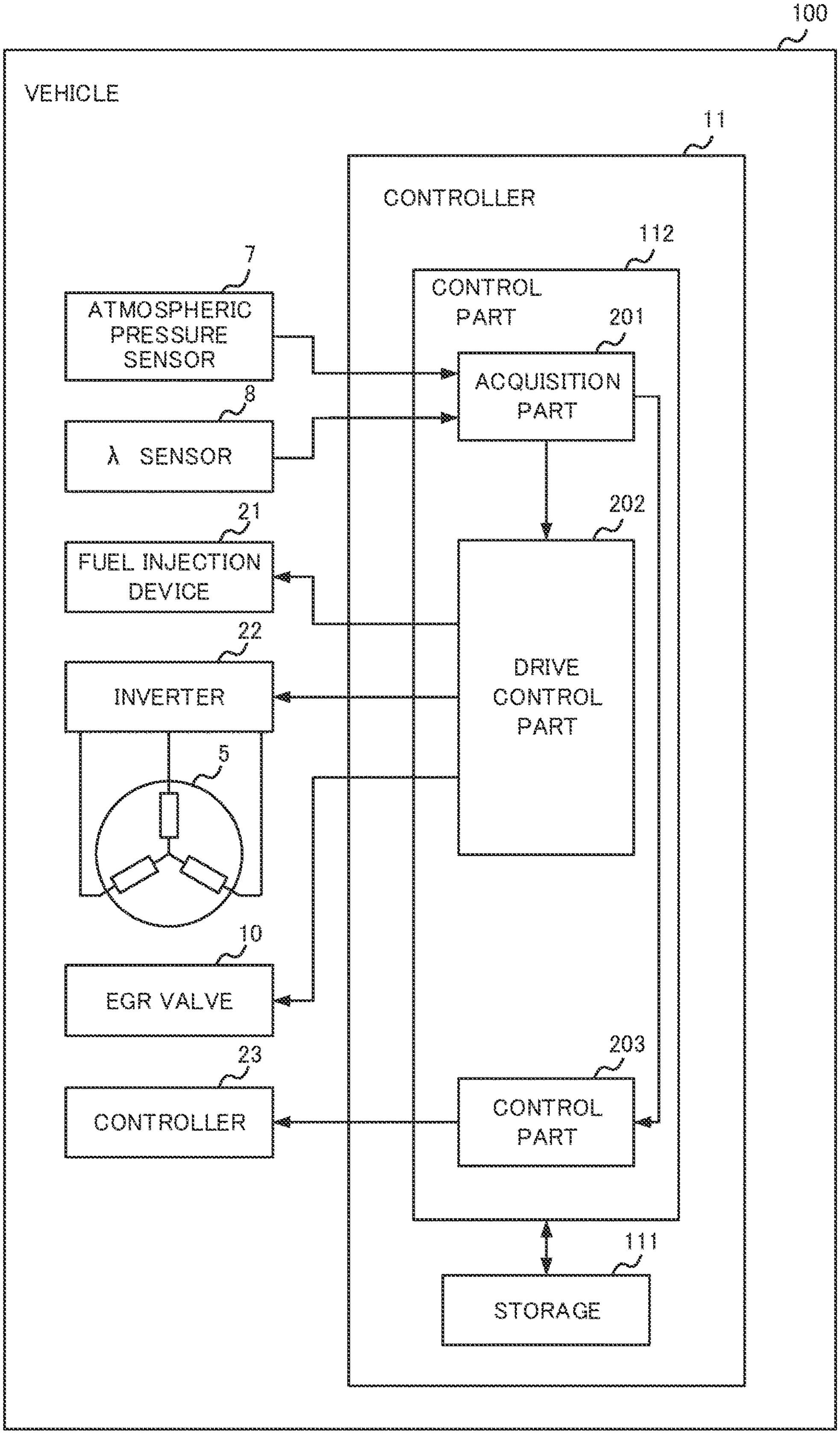
FIG. 2 shows a configuration of main parts of the vehicle.

FIG. 2 shows a configuration of main parts of the vehicle 100. The vehicle 100 includes the atmospheric pressure sensor 7, the λ sensor 8, the fuel injection device 21, an inverter 22, the electric motor 5, the EGR valve 10, a braking device 23, and the controller 11. The controller 11 includes a storage 111 and a control part 112.

The fuel injection device 21 injects fuel into the cylinder of the engine 1. The fuel injection device 21 injects an injection amount of fuel instructed by the control part 112 into the cylinder of the engine 1. The inverter 22 supplies electric power to a plurality of electromagnets provided in a stator of the electric motor 5. The braking device 23 (corresponding to a non-regenerative brake) is a drum brake, for example. The braking device 23 generates a non-regenerative braking force that does not generate electric power during braking.

The storage 111 includes a ROM (Read Only Memory), a RAM (Random Access Memory), and the like, for example. The storage 111 stores various types of programs for causing the control part 112 to function and various types of data. The storage 111 stores an adequate air quantity map which indicates a relationship between (i) an engine torque and (ii) the rotational speed of the engine 1 when the oxygen concentration measured by the λ sensor 8 is equal to or higher than the oxygen threshold value.

Figure 3:
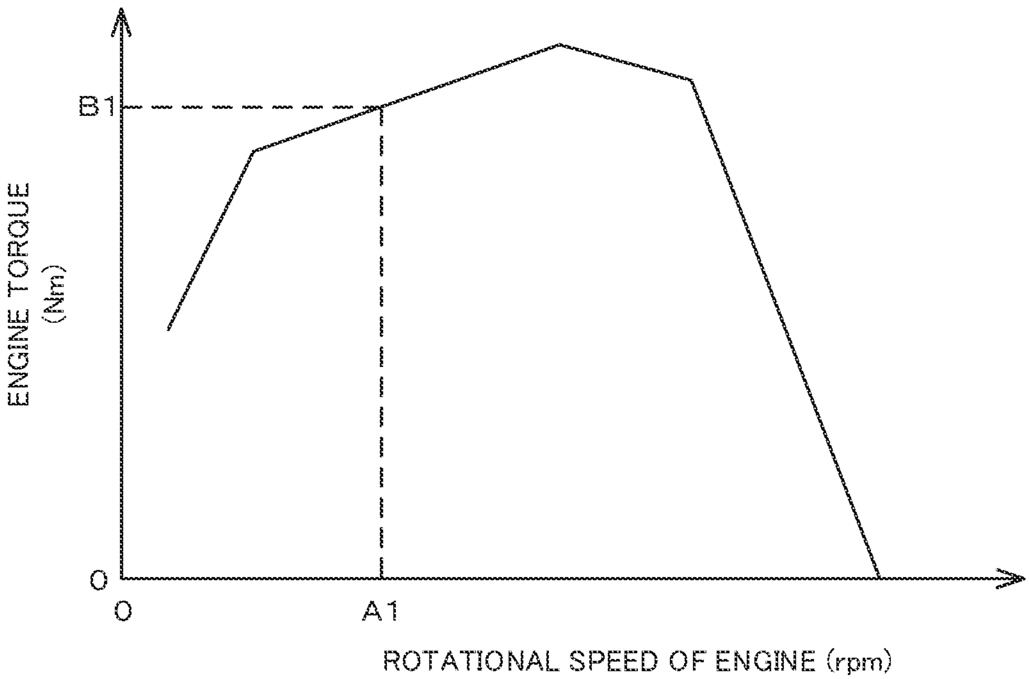
FIG. 3 shows an example of an adequate air quantity map.

FIG. 3 shows an example of the adequate air quantity map. The vertical axis of FIG. 3 represents the engine torque, and the horizontal axis of FIG. 3 represents the rotational speed of an engine. The units of the engine torque are newton-meters (Nm). The units of the rotational speed are rpm (revolutions per minute). Details of the adequate air quantity map, including the meanings of A1 and B1 in FIG. 3, will be described later.

Figure 4:
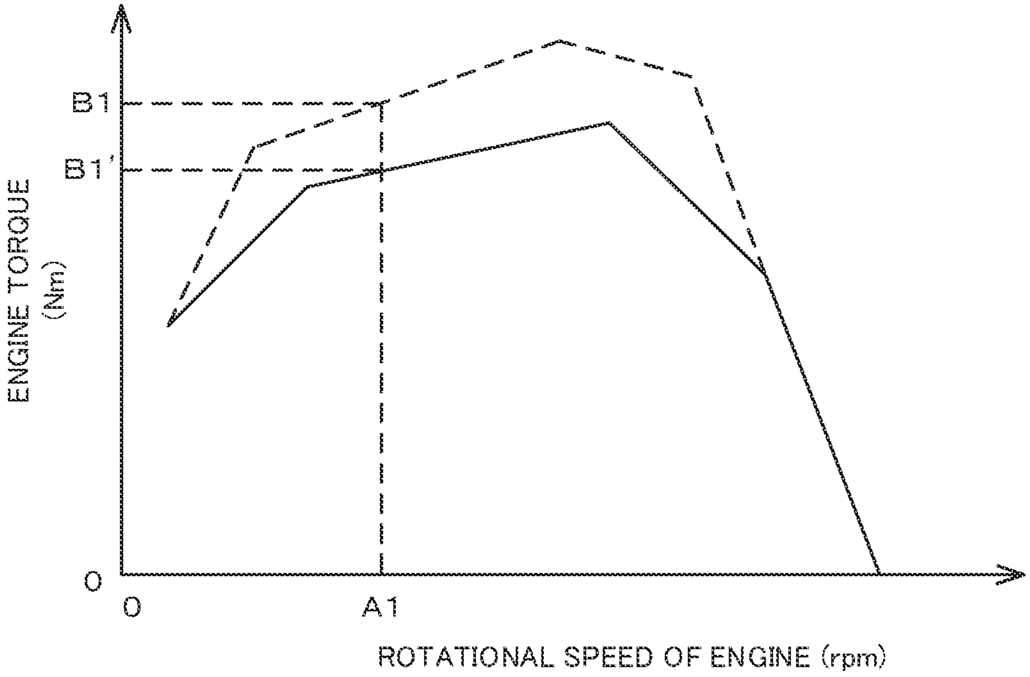
FIG. 4 shows an example of an air shortage map.

The storage 111 may store an air shortage map which indicates a relationship between (i) an engine torque and (ii) the rotational speed of the engine 1 when the oxygen concentration measured by the λ sensor 8 is lower than the oxygen threshold value. FIG. 4 shows an example of the air shortage map. The graph indicated by the broken line in FIG. 4 is the same as the graph shown in the adequate air quantity map shown in FIG. 3. In the air shortage map shown in FIG. 4, an engine torque lower than that in the adequate air quantity map shown in FIG. 3 is assigned to the same rotational speed of the engine 1. The adequate air quantity map and the air shortage map are referenced when a drive control part 202 calculates a target value of the engine torque on the basis of the concentration of oxygen contained in the exhaust of the vehicle 100 and the rotational speed of the engine 1.

Further, the storage 111 may store a low atmospheric pressure map that indicates a relationship between (i) an engine torque and (ii) the rotational speed of the engine 1 when the atmospheric pressure measured by the atmospheric pressure sensor 7 is less than an atmospheric pressure threshold value. The storage 111 may store an appropriate atmospheric pressure map that indicates a relationship between (i) an engine torque and (ii) the rotational speed of the engine 1 when the atmospheric pressure measured by the atmospheric pressure sensor 7 is equal to or greater than the atmospheric pressure threshold value. The low atmospheric pressure map and the appropriate atmospheric pressure map are referenced when the drive control part 202 calculates the target value of the engine torque on the basis of the atmospheric pressure at a position where the vehicle 100 travels and the rotational speed of the engine 1.

Figure 5A:
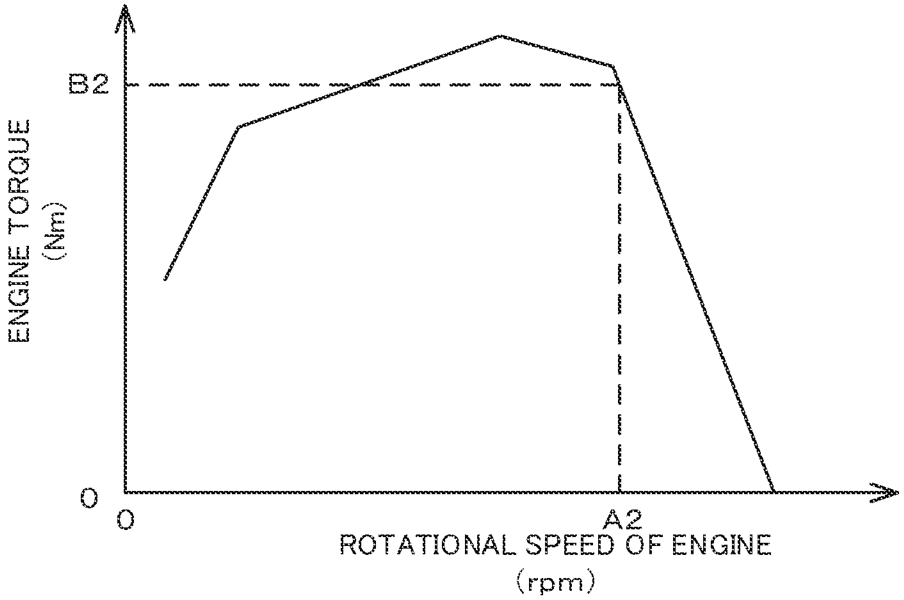
FIG. 5A shows an example of a relationship between the rotational speed of an engine 1 and an engine torque.
Figure 5B:
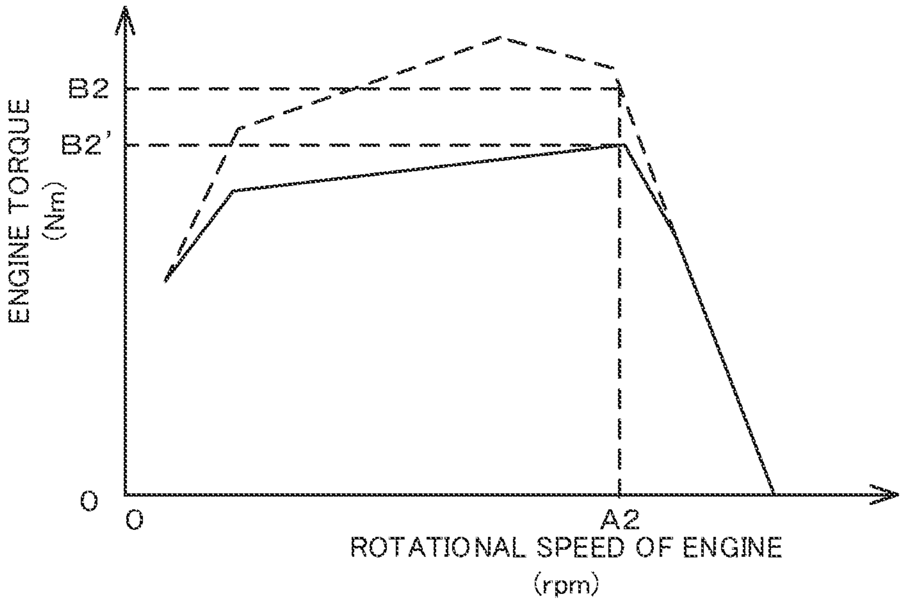
FIG. 5B shows another example of a relationship between the rotational speed of an engine 1 and an engine torque.

FIGS. 5A and 5B each show an example of the relationship between the rotational speed of the engine 1 and the engine torque corresponding to different atmospheric pressures. FIG. 5A shows an example of the appropriate atmospheric pressure map. FIG. 5B shows an example of the low atmospheric pressure map.

The graph indicated by the broken line in FIG. 5B is the same as the graph shown in the appropriate atmospheric pressure map shown in FIG. 5A. In the low atmospheric pressure map shown in FIG. 5B, an engine torque lower than that in the appropriate atmospheric pressure map shown in FIG. 5A is assigned to the same rotational speed of the engine 1.

With reference to FIG. 2 once again, the control part 112 is a processor mounted on the controller 11, for example. The control part 112 functions as an acquisition part 201, the drive control part 202, and a braking control part 203 by executing the programs stored in the storage 111.

The acquisition part 201 acquires, from the atmospheric pressure sensor 7, information indicating the atmospheric pressure of air drawn into the engine 1. The acquisition part 201 acquires, from the λ sensor 8, information indicating the oxygen concentration in the exhaust from the engine 1. The acquisition part 201 outputs the information indicating the acquired atmospheric pressure to the drive control part 202 and the braking control part 203. The acquisition part 201 outputs the information indicating the acquired oxygen concentration to the drive control part 202 and the braking control part 203.

The drive control part 202 controls the engine 1 to control the driving force (the engine driving force) generated by the engine 1. The drive control part 202 controls the electric motor 5 to control the driving force (the electric driving force) generated by the electric motor 5. The drive control part 202 controls the engine driving force and the electric driving force to propel the vehicle 100. The drive control part 202 controls the engine driving force and the electric driving force on the basis of the oxygen concentration acquired by the acquisition part 201. The drive control part 202 controls the engine driving force by having the fuel injection device 21 instruct the injection amount of the fuel. The drive control part 202 controls the electric driving force by supplying the electric power to the plurality of electromagnets provided in the stator of the electric motor 5 via the inverter 22. The drive control part 202 adjusts the amount of the exhaust to be returned to the engine 1 in the exhaust gas recirculation, with the EGR valve 10.

[Control of the Driving Force Based on Oxygen Concentration]

Hereinafter, a method of controlling the engine driving force and the electric driving force performed by the drive control part 202 on the basis of the oxygen concentration acquired by the acquisition part 201 will be described. The drive control part 202 determines whether or not the acquired oxygen concentration is lower than the oxygen threshold value. If the oxygen concentration is lower than the oxygen threshold value, the drive control part 202 reduces the injection amount of the fuel injected by the fuel injection device 21 into the cylinder of the engine 1, in comparison to the case where the oxygen concentration is equal to or higher than the oxygen threshold value.

The drive control part 202 identifies a rotational speed A1 of the engine 1 corresponding to a current traveling speed or a target speed of the vehicle 100. If the oxygen concentration is determined to be equal to or higher than the oxygen threshold value, the drive control part 202 reads, from the storage 111, the adequate air quantity map (see FIG. 3) indicating the relationship between the engine torque and the rotational speed of the engine 1 when the oxygen concentration is equal to or higher than the oxygen threshold value. As shown in FIG. 3, the drive control part 202 references the adequate air quantity map to identify an engine torque B1 corresponding to the identified rotational speed A1. The drive control part 202 identifies the injection amount on the basis of the identified engine torque B1. The drive control part 202 instructs the fuel injection device 21 to inject the identified injection amount.

On the other hand, if the oxygen concentration is determined to be lower than the oxygen threshold value, the drive control part 202 reads, from the storage 111, the air shortage map (see FIG. 4) indicating the relationship between the engine torque and the rotational speed of the engine 1 when the oxygen concentration is lower than the oxygen threshold value. As shown in FIG. 4, the drive control part 202 references the air shortage map to identify an engine torque B1' corresponding to the rotational speed A1. The drive control part 202 identifies the injection amount to be injected by the fuel injection device 21, on the basis of the identified engine torque B1'.

In the air shortage map shown in FIG. 4, the engine torque corresponding to the same rotational speed A1 of the engine 1 is smaller than that in the adequate air quantity map. Therefore, if the oxygen concentration is determined to be lower than the oxygen threshold value, the drive control part 202 reduces the injection amount to be instructed to the fuel injection device 21, in comparison to the case where the oxygen concentration is equal to or higher than the oxygen threshold value.

If the oxygen concentration is determined to be lower than the oxygen threshold value, the drive control part 202 reduces the engine driving force as compared with the case where the oxygen concentration is equal to or higher than the oxygen threshold value, and increases the electric driving force generated by the electric motor 5 so as to compensate for the reduced engine driving force. That is, if the acquired oxygen concentration is lower than the oxygen threshold value, the drive control part 202 increases the ratio of propelling the vehicle with the electric driving force, from among the engine driving force and the electric driving force for propelling the vehicle, in comparison to the case where the oxygen concentration is equal to or greater than the oxygen threshold value.

More specifically, when it is determined that the oxygen concentration is lower than the oxygen threshold value, the engine driving force is reduced as compared with the case where the oxygen concentration is equal to or higher than the oxygen threshold value, and therefore the drive control part 202 calculates a torque shortage caused by the reduction in the engine driving force. The drive control part 202 causes the inverter 22 to operate so as to compensate for the calculated torque, and increases the electric driving force generated by the electric motor 5. At this time, since the electric driving force increases, the ratio of propelling the vehicle with the electric driving force, from among the engine driving force and the electric driving force for propelling the vehicle, increases in comparison to the case where the oxygen concentration is equal to or higher than the oxygen threshold value.

The drive control part 202 is not limited to the example of determining whether or not the oxygen concentration acquired by the acquisition part 201 is equal to or higher than the oxygen threshold value. For example, the drive control part 202 may calculate an air excess ratio on the basis of the acquired oxygen concentration, and determine whether or not the calculated air excess ratio is equal to or greater than a threshold value. If it is determined that the calculated air excess ratio is equal to or greater than the threshold value, the drive control part 202 performs the same processing as when it is determined that the oxygen concentration is equal to or higher than the oxygen threshold value. If it is determined that the calculated air excess ratio is less than the threshold value, the drive control part 202 performs the same processing as when it is determined that the oxygen concentration is lower than the oxygen threshold value.

[Control of the Driving Force Based on Atmospheric Pressure]

The engine torque tends to be insufficient in places where atmospheric pressure is low due to high elevations such as highlands, since the air density in such places is lower than usual. If the atmospheric pressure acquired by the acquisition part 201 is determined to be less than the atmospheric pressure threshold value, the drive control part 202 may increase the electric driving force generated by the electric motor 5, in comparison to the case where the acquired atmospheric pressure is equal to or greater than the atmospheric pressure threshold value, so as to compensate for the insufficient engine torque.

More specifically, the drive control part 202 identifies a rotational speed A2 of the engine 1 corresponding to the current traveling speed or the target speed. If the atmospheric pressure acquired by the acquisition part 201 is determined to be equal to or greater than the atmospheric pressure threshold value, the drive control part 202 reads the appropriate atmospheric pressure map (see FIG. 5A) from the storage 111. The atmospheric pressure threshold value is the minimum value of the atmospheric pressure around the vehicle 100 required for the vehicle 100 to travel without causing insufficient engine torque, for example.

As shown in FIG. 5A, the drive control part 202 references the appropriate atmospheric pressure map to identify an engine torque B2 corresponding to the identified rotational speed A2. The drive control part 202 identifies the injection amount on the basis of the identified engine torque B2. The drive control part 202 instructs the fuel injection device 21 to inject the identified injection amount.

On the other hand, if the acquired atmospheric pressure is determined to be less than the atmospheric pressure threshold value, the drive control part 202 reads the low atmospheric pressure map (see FIG. 5B) from the storage 111. As shown in FIG. 5B, the drive control part 202 references the low atmospheric pressure map to identify an engine torque B2' corresponding to the rotational speed A2. The drive control part 202 identifies the injection amount on the basis of the identified engine torque B2'.

In this case, since the engine driving force is decreased as compared with the case where the atmospheric pressure is equal to or greater than the atmospheric pressure threshold value, the drive control part 202 calculates the amount of torque that is lacking due to the reduction in the engine driving force. The drive control part 202 operates the inverter 22 so as to compensate for the calculated torque, and increases the electric driving force generated by the electric motor 5.

[Control of the Amount of Air to be Returned in the Exhaust Gas Recirculation]

When exhaust gas recirculation for returning the exhaust from the engine 1 to the engine 1 is performed in a state in which the air-fuel ratio, which is the ratio of the mass of air to the mass of fuel in the air-fuel mixture drawn into the engine 1, is excessively small, there is a possibility of an increase in the generation amount of soot due to incomplete combustion of the fuel. Therefore, if the acquired oxygen concentration is lower than a reference value, the drive control part 202 reduces the ratio of the exhaust in the air drawn into the engine 1 during this exhaust gas recirculation, in comparison to the case where the acquired oxygen concentration is equal to or higher than the reference value. The reference value is the minimum value of the oxygen concentration required for the generation amount of soot to fall within an allowable range even when normal exhaust gas recirculation is performed, for example.

[Control of the Regenerative Brake]

The braking control part 203 decelerates the traveling vehicle with (i) the regenerative braking force generated by causing the electric motor 5 to function as the regenerative brake and (ii) the non-regenerative braking force generated by the braking device 23 that does not generate electric power. In order to increase the ratio of propelling the vehicle 100 with the electric driving force as described above, the drive control part 202 needs to increase the amount of electric power supplied from a battery (not shown) to the electric motor 5.

Therefore, when increasing the electric driving force, the braking control part 203 increases the regenerative braking force, from among the regenerative braking force and the non-regenerative braking force, in comparison to the case where the electric driving force is not increased. For example, when increasing the electric driving force, the braking control part 203 increases the regenerative braking force, from among the regenerative braking force and the non-regenerative braking force, as much as possible. On the other hand, when the electric driving force is not increased, the braking control part 203 increases the regenerative braking force, from among the regenerative braking force and the non-regenerative braking force, as little as possible

[Processing Procedure for Controlling the Electric Motor 5 Performed by the Controller 11]

Figure 6:
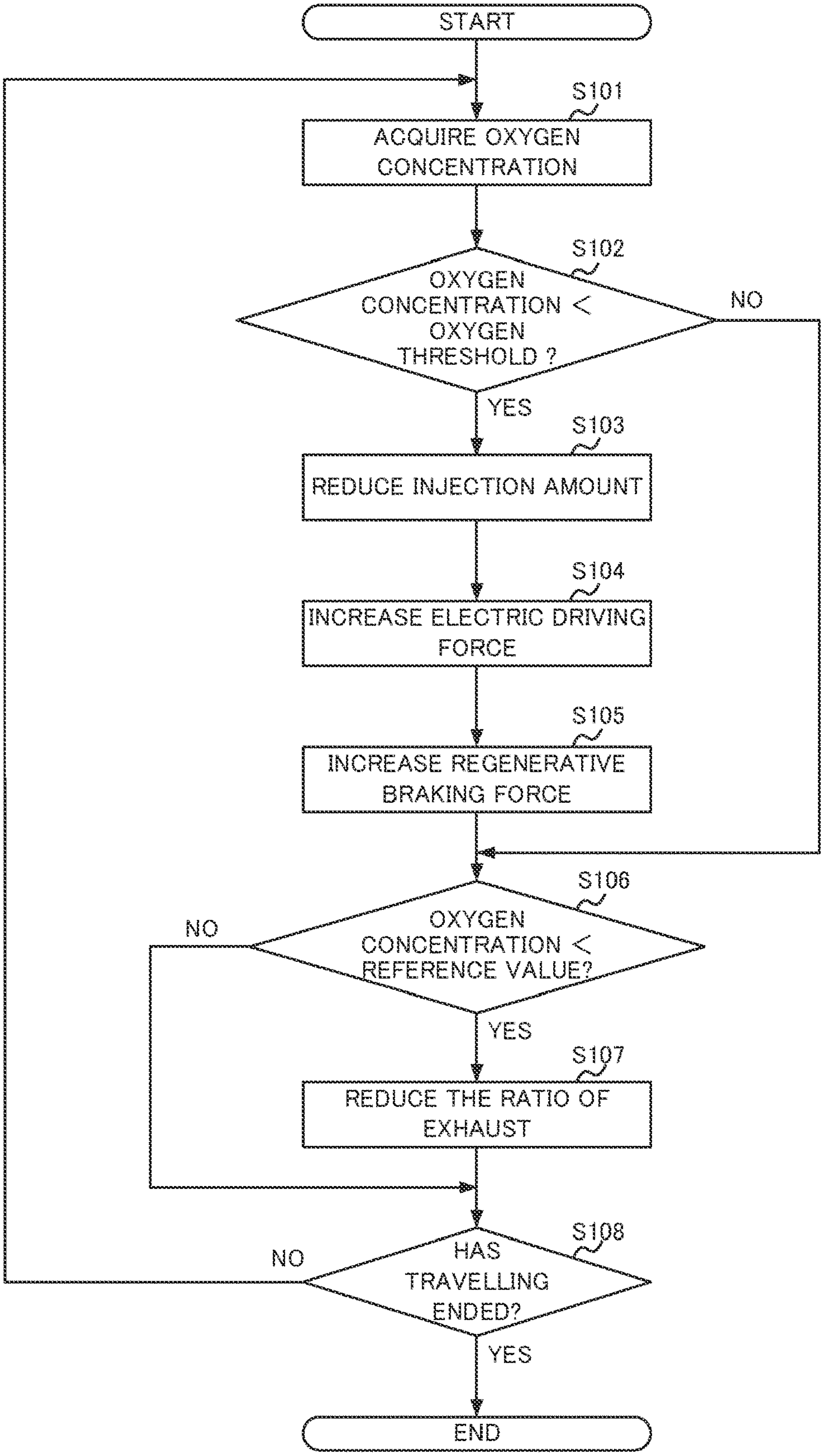
FIG. 6 is a flowchart showing a processing procedure for controlling an engine driving force and an electric driving force, performed by a controller.

FIG. 6 is a flowchart showing a processing procedure for controlling the engine driving force and the electric driving force performed by the controller 11. This processing procedure starts when the vehicle 100 is traveling, for example. First, the acquisition part 201 acquires the oxygen concentration from the λ sensor 8 (S101). The drive control part 202 determines whether or not the acquired oxygen concentration is lower than an oxygen threshold value (S102).

If the acquired oxygen concentration is lower than the oxygen threshold value (YES in S102), the drive control part 202 reduces the injection amount injected into the cylinder of the engine 1 by the fuel injection device 21, in comparison to the case where the oxygen concentration is equal to or higher than the oxygen threshold value (S103). The drive control part 202 increases the electric driving force, from among the engine driving force and the electric driving force for propelling the vehicle (S104). The braking control part 203 increases the regenerative braking force, from among the regenerative braking force and the non-regenerative braking force (S105).

The drive control part 202 determines whether or not the acquired oxygen concentration is lower than a reference value (S106). If the acquired oxygen concentration is lower than the reference value (YES in S106), the drive control part 202 reduces the ratio of the exhaust in the air drawn into the engine 1 in the exhaust gas recirculation (S107). The drive control part 202 determines whether or not the traveling of the vehicle 100 has ended (S108). If it is determined that the traveling of the vehicle 100 has ended (YES in S108), the drive control part 202 ends the process.

If the oxygen concentration is equal to or higher than the oxygen threshold value in the determination in S102 (NO in S102), the drive control part 202 proceeds to the determination of S106. If the oxygen concentration acquired in the determination in S106 is equal to or higher than the reference value (NO in S106), the drive control part 202 proceeds to the determination of S108. If it is determined that the traveling of the vehicle 100 has not ended in the determination in S108 (NO in S108), the drive control part 202 returns to the process in S101.

[Processing Procedure for Controlling the Electric Motor 5 Performed by the Controller 11]

Figure 7:
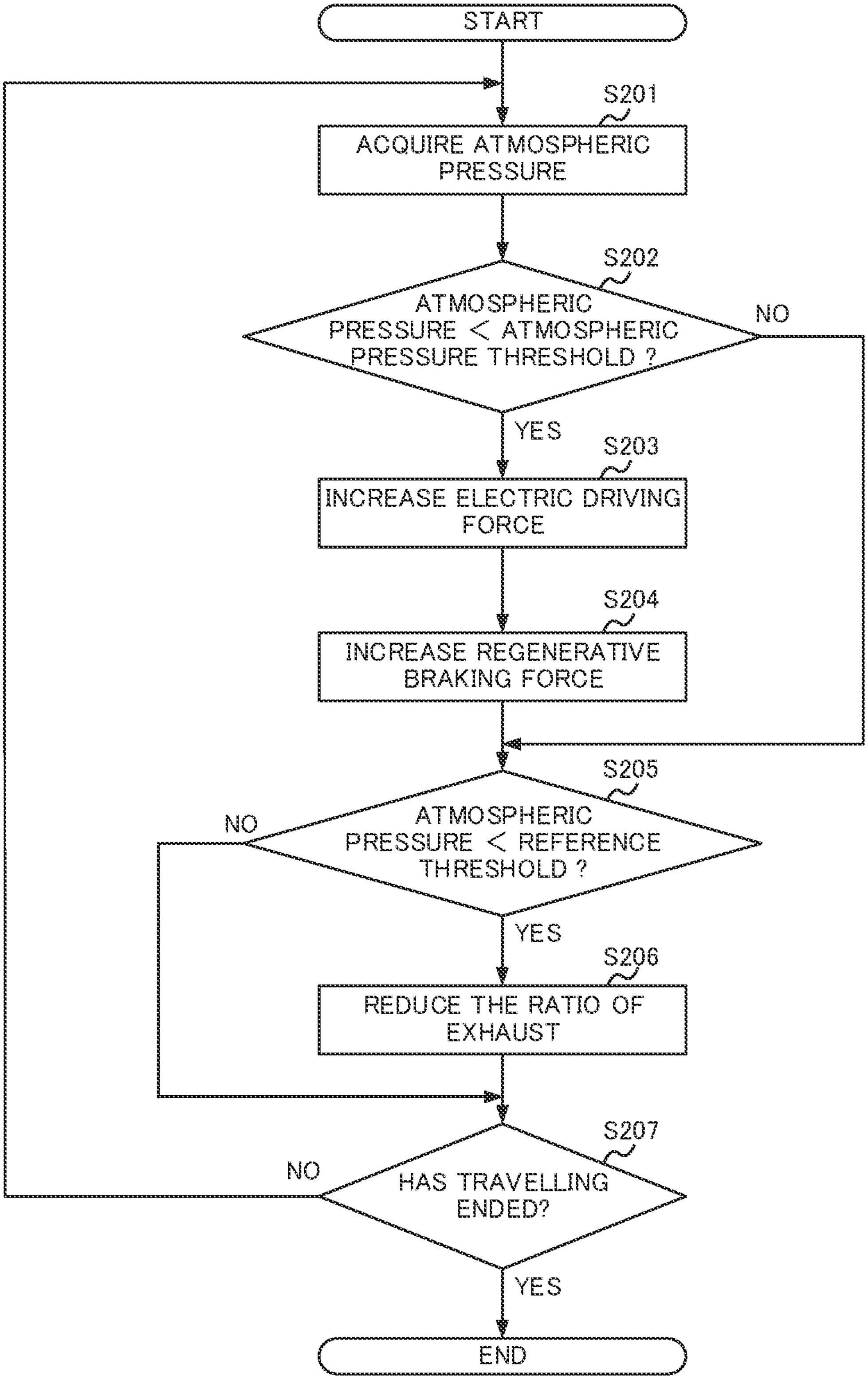
FIG. 7 is a flowchart showing another processing procedure for controlling the engine driving force and the electric driving force, performed by the controller.

FIG. 7 is a flowchart showing another processing procedure for controlling the engine driving force and the electric driving force performed by the controller 11. This processing procedure starts when the vehicle 100 is traveling, for example. First, the acquisition part 201 acquires information indicating atmospheric pressure of the air drawn into the engine 1 from the atmospheric pressure sensor 7 (S201) The drive control part 202 determines whether or not the acquired atmospheric pressure is less than an atmospheric pressure threshold value (S202).

If the acquired atmospheric pressure is less than the atmospheric pressure threshold value (YES in S202), the drive control part 202 increases the electric driving force generated by the electric motor 5, in comparison to the case where the acquired atmospheric pressure is equal to or greater than the atmospheric pressure threshold value (S203). The braking control part 203 increases the regenerative braking force, from among the regenerative braking force and the non-regenerative braking force during braking, as compared with the case where the acquired atmospheric pressure is equal to or greater than the atmospheric pressure threshold value (S204).

The drive control part 202 determines whether or not the acquired atmospheric pressure is less than a reference value (S205). If the acquired atmospheric pressure is less than the reference value (YES in S205), the drive control part 202 reduces the ratio of the exhaust in the air drawn into the engine 1 in the exhaust gas recirculation (S206). The drive control part 202 determines whether or not the traveling of the vehicle 100 has ended (S207). If it is determined that the traveling of the vehicle 100 has ended (YES in S207), the drive control part 202 ends the process.

If the atmospheric pressure is equal to or greater than the atmospheric pressure threshold value in the determination in S202 (NO in S202), the drive control part 202 proceeds to the determination of S205. If the atmospheric pressure acquired in the determination in S205 is equal to or greater than the reference value (NO in S205), the drive control part 202 proceeds to the determination of S207. If it is determined that the traveling of the vehicle 100 has not ended in the determination in S207 (NO in S207), the drive control part 202 returns to the process in S201.

[Effect of the Controller 11 of the Present Embodiment]

When the oxygen concentration is lower than the oxygen threshold value, the drive control part 202 reduces the injection amount of the fuel injected into the cylinder of the engine 1 and increases the electric driving force, from among the engine driving force and the electric driving force for propelling the vehicle 100, in comparison to the case where the oxygen concentration is equal to or higher than the oxygen threshold value. Therefore, the drive control part 202 can prevent insufficient engine torque while preventing the air-fuel ratio from becoming excessively small.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A controller comprising:

an acquisition part that acquires an oxygen concentration of exhaust from an engine; and a drive control part that reduces an injection amount of fuel injected into a cylinder of the engine and increases an electric driving force generated by an electric motor, from among the electric driving force generated by the electric motor and an engine driving force generated by the engine for propelling the vehicle, when the oxygen concentration is lower than an oxygen threshold value in comparison to when the oxygen concentration is equal to or higher than the oxygen threshold value, wherein the drive control part:

identifies a rotational speed of the engine corresponding to a current traveling speed or a target speed of the vehicle, identifies a first engine torque corresponding to the identified rotational speed when it is determined that the oxygen concentration is equal to or higher than the oxygen threshold value by referencing a first map indicating a relationship between an engine torque and the rotational speed of the engine when the oxygen concentration is equal to or higher than the oxygen threshold value, identifies a first injection amount on the basis of the identified first engine torque, identifies a second engine torque corresponding to the identified rotational speed of the engine when it is determined that the oxygen concentration is lower than the oxygen threshold value by referencing a second map indicating a relationship between an engine torque and the rotational speed of the engine when the oxygen concentration is lower than the oxygen threshold value, and identifies a second injection amount which is smaller than the first injection amount, on the basis of the identified second engine torque.

2. The controller according to claim 1, wherein the acquisition part further acquires atmospheric pressure of air drawn into the engine, and the drive control part increases the electric driving force, from among the engine driving force and the electric driving force, when the atmospheric pressure is less than an atmospheric pressure threshold value in comparison to when the atmospheric pressure is equal to or greater than the atmospheric pressure threshold value.

3. The controller according to claim 1, further comprising:

a braking control part that decelerates the vehicle during traveling with a regenerative braking force generated by a regenerative brake that generates electric power and a non-regenerative braking force generated by a non-regenerative brake that does not generate electric power, and increases the regenerative braking force, from among the regenerative braking force and the non-regenerative braking force, when the electric driving force is being increased in comparison to when the electric driving force is not increased.

4. The controller according to claim 1, wherein the drive control part reduces a ratio of the exhaust in air drawn into the engine in exhaust gas recirculation for returning the exhaust from the engine to the engine, when the oxygen concentration is lower than a reference value in comparison to when the oxygen concentration is equal to or higher than the reference value.

5. A vehicle comprising:

an electric motor that generates an electric driving force for propelling the vehicle;

an engine that generates an engine driving force for propelling the vehicle;

an acquisition part that acquires an oxygen concentration of exhaust from the engine; and a drive control part that reduces an injection amount of fuel injected into a cylinder of the engine and increases an electric driving force, from among the engine driving force and the electric driving force for propelling the vehicle, when the oxygen concentration is lower than an oxygen threshold value in comparison to when the oxygen concentration is equal to or higher than the oxygen threshold value;

wherein the drive control part:

identifies a rotational speed of the engine corresponding to a current traveling speed or a target speed of the vehicle, identifies a first engine torque corresponding to the identified rotational speed when it is determined that the oxygen concentration is equal to or higher than the oxygen threshold value by referencing a first map indicating a relationship between an engine torque and the rotational speed of the engine when the oxygen concentration is equal to or higher than the oxygen threshold value, identifies a first injection amount on the basis of the identified first engine torque, identifies a second engine torque corresponding to the identified rotational speed of the engine when it is determined that the oxygen concentration is lower than the oxygen threshold value by referencing a second map indicating a relationship between an engine torque and the rotational speed of the engine when the oxygen concentration is lower than the oxygen threshold value, and identifies a second injection amount which is smaller than the first injection amount, on the basis of the identified second engine torque.

6. A control method comprising computer-implemented steps of:

acquiring an oxygen concentration of exhaust from an engine;

reducing an injection amount of fuel injected into a cylinder of the engine and increasing an electric driving force generated by an electric motor, from among the electric driving force generated by the electric motor and an engine driving force generated by the engine for propelling the vehicle, when the oxygen concentration is lower than an oxygen threshold value in comparison to when the oxygen concentration is equal to or higher than the oxygen threshold value;

identifying a rotational speed of the engine corresponding to a current traveling speed or a target speed of the vehicle;

identifying a first engine torque corresponding to the identified rotational speed when it is determined that the oxygen concentration is equal to or higher than the oxygen threshold value by referencing a first map indicating a relationship between an engine torque and the rotational speed of the engine when the oxygen concentration is equal to or higher than the oxygen threshold value;

identifying a first injection amount on the basis of the identified first engine torque;

identifying a second engine torque corresponding to the identified rotational speed of the engine when it is determined that the oxygen concentration is lower than the oxygen threshold value by referencing a second map indicating a relationship between an engine torque and the rotational speed of the engine when the oxygen concentration is lower than the oxygen threshold value; and identifying a second injection amount which is smaller than the first injection amount, on the basis of the identified second engine torque.

* * * * *